Oct. 25, 1966 D. W. SEYMOUR 3,280,741

ELECTROSTATIC RECORDING

Filed Dec. 31, 1958 5 Sheets-Sheet 1

INVENTOR.
DAVID W. SEYMOUR
BY Edward W. Hughes
ATTORNEY

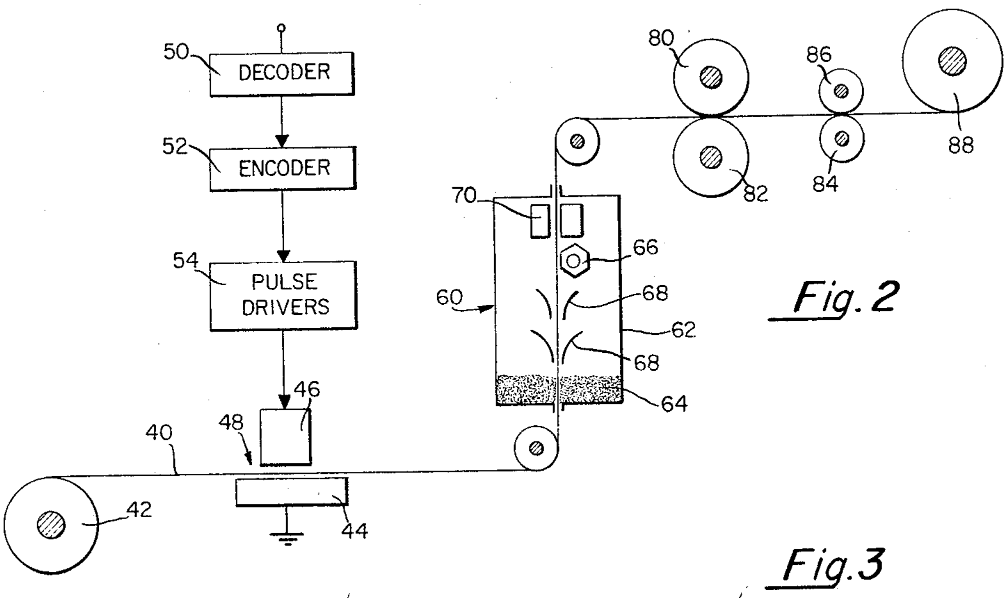
Fig. 2, Fig. 3
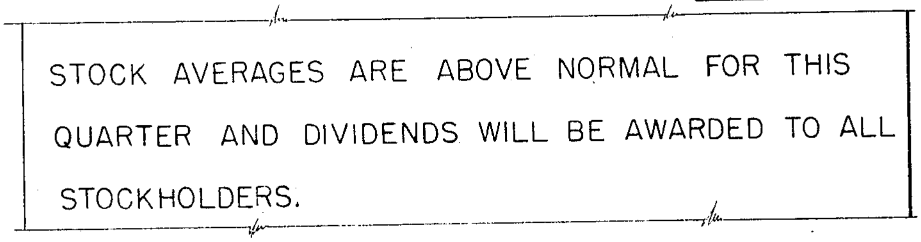
Fig. 4
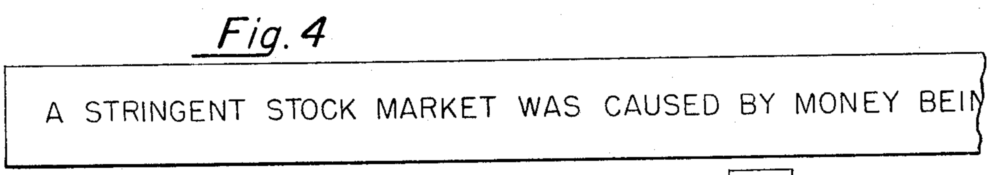
Fig. 12
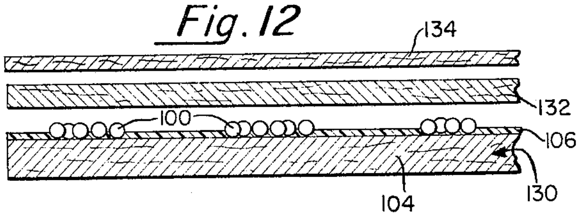
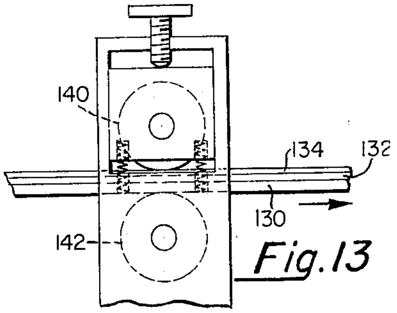
Fig. 13
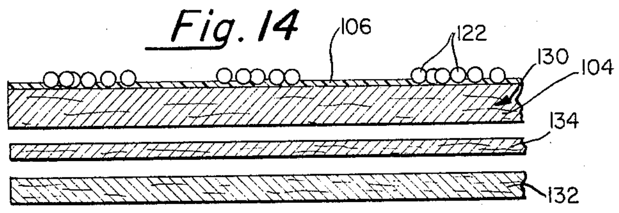
Fig. 14
INVENTOR.
DAVID W. SEYMOUR
BY
Edward W. Hughes
ATTORNEY

INVENTOR.
DAVID W. SEYMOUR

Oct. 25, 1966 D. W. SEYMOUR 3,280,741

ELECTROSTATIC RECORDING

Filed Dec. 31, 1958 5 Sheets-Sheet 4

INVENTOR.
DAVID W. SEYMOUR
BY Edward W. Hughes
ATTORNEY

INVENTOR.
DAVID W. SEYMOUR

United States Patent Office 3,280,741

Patented Oct. 25, 1966

3,280,741

ELECTROSTATIC RECORDING

David W. Seymour, King of Prussia, Pa., assignor to Burroughs Corporation, Detroit, Mich., a corporation of Michigan Filed Dec. 31, 1958, Ser. No. 784,300
18 Claims. (Cl. 101—426)

This invention relates to electrostatic recording processes and apparatus and more particularly to improvements in dry powdered electrically conductive inks for developing electrosatic images which result in improved fixing techniques.

The electrostatic recording process ordinarily broadly comprises three steps. The first step establishes, by forming or printing, electrically charged areas on selected portions of a recording medium, which areas are representative of information. The second step develops such charged areas on the recording medium, for example, by making them visible. The third step fixes or renders such developed areas substantially permanent. In the electrostatic recording process, these three steps may take place sequentially and at physically separate locations.

In electrostatic recording, an electrostatic latent image is established on the charge retentive surface of a recording medium. The latent image is formed of electrically charged areas on the medium in and amongst substantially uncharged areas. The position, size, and shape of the charged areas, the electrostatic latent image, represents information in some form. The dry powder ink or developer has the function of making the latent image on the medium detectable. To do this, the ink should adhere firmly to the charged areas of the medium and preferably not at all to the substantially uncharged areas of the medium. Where the purpose of the ink is to make the latent electrostatic image visible, then the color of the ink adhering to the charged portion should contrast with the color of the medium to which it is fixed, and the amount of ink adhering should be such that it is easy for the human eye to distinguish between inked and un-inked areas.

The electrical resistance of the conductive dry powder inks determines how quickly the latent images can be developed, which is of great importance in high speed applications. The term bulk resistance of such inks as used hereafter, is measured by placing enough of the ink in a 1 inch diameter cylinder to fill it to a depth of 1 inch. A one hundred gram weight is then placed on top of the column of ink powder, and the electrical resistance between the ends of the column is then measured in ohms. For a given speed of developing electrostatic latent images, there is an upper limit to the value of the bulk resistance for the developer at which good inking will take place. This upper limit for slow speed is of the order of 10,000 ohms, measured in the manner described above; for very high speed printers, such upper limit is of the order of 1,000 ohms. The lower the bulk resistance of the ink, the greater the speed at which inking of the latent images can be accomplished. Thus a minimum value of bulk resistance, as measured by the method pointed out above, is a desirable characteristic for conductive inks.

It should be recognized that these limiting values of bulk resistance are pragmatically established, and apply to convenient designs of inking devices or chambers, as described, for example, in co-pending application for United States Patent Serial No. 714,767, filed February 12, 1958, now forfeited, by Robert E. Benn and Herman Epstein, entitled "Electrographic Recording Process," which application is assigned to the assignee of this application, said application having been forfeited in favor of continuation copending application for United States Patent Serial No. 255,715, filed January 25, 1963, for "Recording Medium and Process of Developing Latent Electrostatic Image on a Recording Medium." As is described in more detail in the referenced application, high conductivity of the ink is desirable in order that the induced charges on the conductive backing of the electrostatic recording medium may flow through the bulk of ink into the ink particles in immediate proximity to the latent electrostatic image borne by the dielectric surface of the recording medium. The smaller the bulk resistance of the ink, the more rapidly such charge flow will occur. For a given geometry of inking device, the resistance to such flow will be proportional to the bulk resistance of the ink; but it is possible to provide conducting paths of materials of much lower resistivity than the ink, to shunt at least partially the paths through the ink. The ingenious provision of such shunting paths to minimize the distance that charges must flow through the ink itself would permit operation with inks having bulk resistances greater than the maximum value herein specified as desirable; but it is so simple, by means of the present invention, to provide adequately high bulk conductivity (or low bulk resistance) that such practice would ordinarily be unnecessary.

Another highly important characteristic of the ink is the difference between how well the particles constituting the ink are attracted to, and adhere to, the charged areas on the recording medium compared with how they adhere to the uncharged areas; or the discrimination of the inks for the charged areas as compared with the uncharged areas of the recording areas. This characteristic is a function of both the overall size, or diameter, of the particles, and their density. While it would be a formidable task to make an exact mathematical analysis of the charge distribution induced upon a mass of particles of irregular shape when in contact with a dielectric medium bearing a latent image of electric charges, general physical considerations of a fairly elementary nature suggest that the charge so induced on an ink particle of given size will be roughly proportional to the projected area of the particle on a projection plane parallel to the plane of the dielectric medium. For particles of similar shape, differing in linear dimensions only by a dimensionless scale factor, the total charge on a particle, and therefore the force exerted upon the particle by a given electric field, will then be roughly proportional to the square of the scale factor. For a given specific gravity or density of the material composing the particle, the weight of the particle will be proportional to the cube of the scale factor. It appears from these considerations that if the scale factor of a particle of given shape is increased, the force exerted on it by a given electric field will increase less rapidly than the weight or mass of the particle; so that finally the force exerted by a given field will be less than the weight of the particle, and thus insufficient even to raise the particle against the local gravitational field, to say nothing of retaining it in place against casual accelerations such as vibrations. It is clear that the absolute value of the maximum scale factor (or particle diameter, or representative particle dimension) which can be used practically in developing latent electrostatic images will be less, the greater the density of the particle.

The particles of the ink having a size of less than 10 microns adhere to the uncharged areas of the medium about as well as they do the charged areas. This is, of course, undesirable since the adherence of ink to the uncharged areas of the medium reduces the contrast between printed and unprinted areas. Attempts to remove the ink adhering to the background or uncharged areas, also tend to remove the ink from the charged areas. The problem of discrimination is thus essentially a function of the percentage of particles in the ink below a certain minimum size, normally about 10 microns, and it is therefore desirable that the number of particles in the powder of a size of less than 10 microns be minimized.

There is also an upper limit to the particle size which will satisfactorily adhere to the electrically charged areas of the medium. Particles having diameters greater than approximately 80 microns do not adhere well to electrically charged areas of the electrostatic latent image irrespective of how small the specific gravity of the particles may be. (The term "diameter" is literally applicable to spheres but since many of the particles considered herein are not truly spherical, the term is viewed here in a looser sense as the diameter of a sphere of the same density as the non-spherical particle and having the same mass as the particle.) Within the range from 10 to 80 microns, the greater the density of the particle, the lower the maximum particle size which will be attracted to and retained by the electrostatic latent image. With particles having specific gravities of 10 or more, the maximum diameter of particles which will adhere to the electrostatic latent image is approximately equal to, or less than, 10 microns; and such particle size, as mentioned hereinabove, will adhere both to the charged and uncharged areas of the recording medium, which is obviously undesired. Thus, as regards particle size, it is desirable to avoid having particles of diameters less than 10 microns and likewise to avoid having particles above 80 microns, the maximum size which will adhere to the charged areas of the medium. It is also desirable that the specific gravity of the particles be sufficiently low so that the maximum size of particles which will adhere to the latent image approaches 80 microns. The maximum density for particles of 80 microns diameter which will adhere well to electrostatic latent images corresponds to a specific gravity of substantially four.

The electrostatic recording process is intended as a high speed printing operation, and the high speed results because only a very brief interval of time, in the order of millimicroseconds, is required to establish an electrically charged area on the charge retentive, or dielectric layer, of a recording medium; and because the developing and fixing steps can be accomplished continuously and at speeds comparable with the printing speed. The only moving parts of the electrostatic recording apparatus are normally those associated with the movement of the recording medium through the printing, developing, and fixing stations, which movement can be continuous or uninterrupted. Thus, the inertia of moving parts of the printing station which heretofore has limited the speed of mechanical printers, is not a serious problem for electrostatic recording.

Heretofore in electrostatic recording, the most commonly used electrically conductive dry powdered ink, or developer, has been made by spray drying a mixture of carbon black and a thermoplastic resin. While the carbon black-resin ink is satisfactory for developing electrostatic latent images, there are certain difficulties and problems associated with using such an ink. Among these are the fact that the distribution of particle size resulting from the manufacturing process is wider than that desired. There is a substantial proportion of particles smaller than 10 microns that must be removed. There is also a proportion of oversized particles which will not adhere to the electrostatically charged areas of a recording medium. The removal of the oversized and undersized particles is difficult and increases the cost of producing a satisfactory ink.

With a thermosplastic based ink, the method of fixing the ink to the recording medium heretofore has been by heating both the recording medium and the ink attracted to the electrostatic latent image thereon, until the dielectric layer, which may also have a thermoplastic property, and the ink particles, become tacky. While the ink and dielectric layer are tacky, calendering rolls are used to force the ink particles into the dielectric layer. Because the ink particles which include thermoplastic resin are heat sensitive, the maximum temperatures to which such inks may be subjected, both in storing and in use, is limited; otherwise, the particles will agglomerate and form particles of sizes which exceed the upper limit for satisfactory inking. Another problem associated with carbon black thermoplastic resin ink is that such particles are not strong or tough and that they do not have any significant resistance to crushing. Thus they are not adapted to be fixed solely by pressure.

As the printing speed has increase, the speed with which the recording medium passes through the fixing station has correspondingly also increased. In order to supply sufficient heat for rendering the recording medium and the ink tacky, it has been necessary to provide a comparatively large heat source operating at a substantially elevated temperature. When no message is being printed and the recording medium is not moving through the fixer, the temperature of the heat source can be so great as to cause the recording medium to fracture, so that it was found necessary to develop means for physically removing the recording medium from the effects of the heater before the advance of the medium was discontinued. Another difficulty with heat fixing was the large consumption of electrical power employed for this purpose. Further, the presence of a large heat source in close proximity to the other components of the printing apparatus has usually made it necessary to design all components for operation at elevated temperatures. There thus has been a need for another method of fixing the ink to the recording medium.

A limitation in recording solely by electric fields has been the inability to produce more than a single original copy of a message. In many applications, it is desirable to have several copies of each message. There has heretofore been no process for readily and economically making copies of the message as originally printed by this electrostatic recording process.

A solution to the various difficulties and problems of electrostatic recording mentioned hereinabove has been provided by this invention. An improved ink which lends itself to fixing by other than heat fixing techniques and which enables the simultaneous production of multiple copies has been developed. Materials are used in industrial processes which meet certain of the desired specifications. These materials can be produced economically in a desirable range of particle sizes, sufficiently approximating spheres so that in bulk they flow freely like a powder, and are of desirably low density, and sufficiently strong so that they may be fixed in the dielectric recording surface of the medium by being simply pressed into and if need be through it to the paper backing of the medium; and the rigidity of such materials is such that when thus embedded they may be employed to apply pressure to pressure-sensitive means such as carbon paper to provide copies of the message they represent. Such materials, however, are not sufficiently electrically conducting in bulk, where current must flow from one particle to another, to be usable in such form for development of electrostatic charge images.

In the carrying out of the objects of this invention, the benefit of the virtues of the powder materials as above described has been retained while at the same time overcoming their defect of very low electrical conductivity. This has been accomplished by forming thin electrically conductive coatings on particles of the desired distribution of sizes, densities, and crush resistance, such as glass beads and non-vitreous (non-glassy) ceramic particles. The distribution of particle sizes obtained from commercially available glass beads and clay ceramic particles employed as petroleum cracking catalysts has been found suitable for this coating application. The bulk electrical resistance of such coated particles is adequately low and their density is sufficiently low so that a broad range of particle sizes produces good inking. The individual glass beads and non-vitreous particles are tough, have a high resistance to crushing, and are substantially nonfriable at the pressure necessary to pressure fix them to the recording medium. The expression "non-friable" as used herein is intended to mean that the glass beads and non-vitreous particles will not crush at the pressure necessary to pressure-fix them to the recording medium. With the development of these new conductive, non-friable inks pressure fixing of the developed latent image at normal room temperature has become possible. Another and unexpected result of the use of such non-friable conductive inks is that each electrostatic recording message so developed may also constitute a relief master, which master can be used to duplicate economically copies of an original electrostatically recorded message.

It is, therefore, an important object of this invention to provide improvements in the method of developing and fixing electrostatic recorded information.

It is another important object of this invention to provide improved dry powder, conductive inks for developing electrostatic latent images.

It is still another important object of this invention to produce an electrostatically recorded message which constitutes a relief master.

It is a further important object of this invention to provide an improved developer for electrostatic latent images whose electrical resistance is minimized and which is economical to produce.

It is a still further important object of this invention to provide an improved dry powdered conductive ink in which substantially all the particles thereof have similar characteristics and the distribution of particle size is within a desired range of sizes.

It is still another important object of this invention to produce an improved ink for electrostatic recording, the particles of which are capable of being pressure-fixed to the recording medium.

It is another important object of this invention to produce an electrically conductive dry powdered ink in a variety of colors.

It is another important object of this invention to produce a dry powdered ink for electrostatic recording which will not have its characteristics adversely affected in shipping, storage and use.

It is still another important object of this invention to provide an improved method for fixing developed electrostatic latent images.

Other important objects and many of the attendant advantages of this invention will be readily appreciated as the same become better understood by reference to the following detailed description when considered in connection with the accompanying drawings, wherein:

FIG. 2 is a schematic diagram of an electrostatic strip printing apparatus;

FIG. 3 is an example of electrostatic recording as produced by a page printer as illustrated in FIG. 1;

FIG. 4 is an example of the type of electrostatic recording produced by strip printers such as illustrated in FIG. 2;

FIG. 12 is an enlarged, slightly exploded, schematic cross sectional view showing an arrangement of the electrostatically recorded relief master, copy paper, and carbon paper necessary for making a positive copy of the information recorded on the master;

FIG. 13 is a schematic side elevation of apparatus suitable for making copies of electrostatically recorded information;

FIG. 14 is a second arrangement of a relief master, carbon paper, and copy paper for making a positive copy by the relief process.

Figure 1:
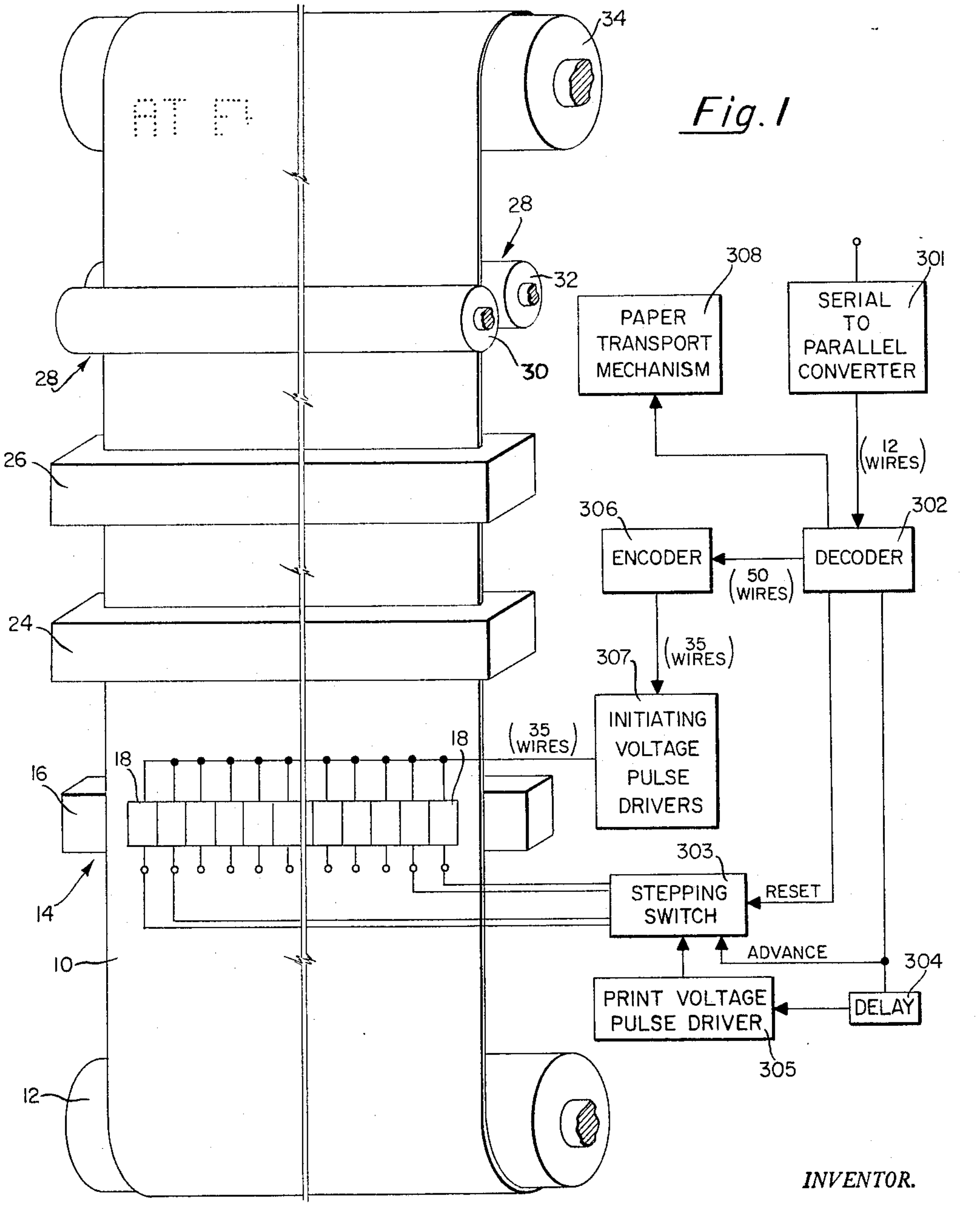
FIG. 1 is a schematic diagram of an electrostatic page printing apparatus.

FIG. 1 is a schematic view of the page printer corresponding substantially with that described and claimed in the copending application for United States Patent, Serial No. 734,253, filed May 9, 1958, by Robert E. Benn, Richard S. Howell and Richard S. Sakurai, entitled "Electrographic Recording Apparatus," now U.S. Patent No. 3,068,479 which application is assigned to the same assignee as the present invention.

In the apparatus illustrated, the electrostatic recording medium 10 may be initially stored on supply roll 12. As the medium 10 is unrolled, it passes through the printing station generally indicated at 14 which is comprised of an anvil or back electrode 16, and *n* number of print heads 18, where *n*, in a preferred example, is made equal to seventy-two. A preferred construction of the print heads is described and claimed in the copending application for United States Patent, Serial No. 734,196, filed May 9, 1958, by Richard S. Howell, entitled "Electrographic Printing Head," which application is assigned to the assignee of this invention. At the printing station 14, latent electrostatic images are established on the charge retentive layer, or dielectric layer, of the recording medium 10 by apparatus that is fully set forth in the above referred to copending patent applications.

Figures 8, 15:
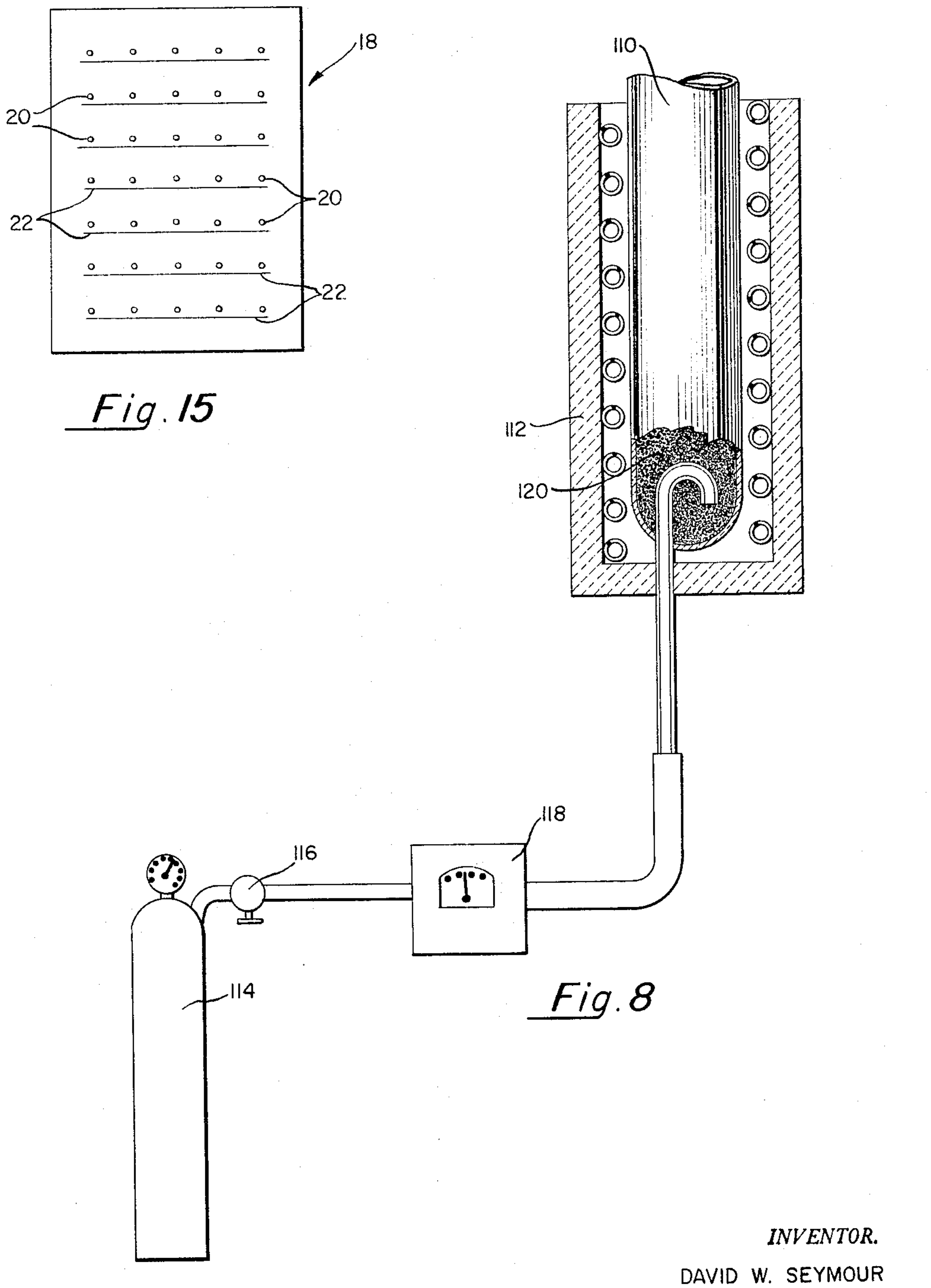
FIG. 8 is a schematic diagram of the apparatus for the pyrolytic coating of fluid cracking catalyst with carbon by pyrolysis of the gaseous hydrocarbon of the paraffin series.
FIG. 15 is a representation of a print head suitable for employment in the apparatus represented in FIGURE 1.

FIGURE 15 is a representation of a head 18, viewed from the working side or face adjacent to the recording medium 10. It consists of a suitable insulating support in which there are supported pin-like printing electrodes 20 arranged in rows and columns. The particular representation shows thirty-five such pins which are arranged in a matrix of seven rows and five columns. Auxiliary electrodes 22 of bar shape are located adjacent to these pins. If between a given pin and the auxiliary electrode nearest to it, there is applied a voltage sufficient to cause breakdown of the air between the two, an electrical discharge will occur which will be a prolific source of ions and electrons. If, now, a potential is maintained between the pin electrode and the back electrode, the resulting electric field will cause a flow of charged particles of given sign toward the back electrode 16. However, the presence of medium 10 will prevent such charged particles from actually reaching back electrode 16, and they will instead form a charge on the high-resistance dielectric surface of medium 10. Because of the small dimensions of the pin, this charge will be distributed over an area relatively small but somewhat larger than the area of the face of the pin.

The various dimensions and voltages are such that in the operation of head 18 the charges produced by exciting, as above described, electrical discharges between an auxiliary electrode 22 and two adjacent pins 20 will produce on medium 10 charges which will actually slightly overlap. Thus, if, for example, discharges are produced from all the pin electrodes in a given row, a charge will be produced on medium 10 which will be substantially a continuous horizontal line. It thus appears that by producing discharges at suitably selected pins among the thirty-five represented, it is possible to produce a charge pattern substantially continuous and delineating a particular symbol, such as an alphabetic letter or an arabic numeral. This technique of forming symbols is sometimes denoted as "dot" printing, and the type of head here represented is called a "matrix" head.

The apparatus illustrated in FIGURE 1 includes legend bearing blocks which represent equipment elements for performing certain functions; the actual physical embodiments of such elements may assume a variety of forms and, indeed, may not even appear as discrete units. The required functions, however, can be adequately described despite this fact, with the understanding that much known art including the referenced applications for United States patents is available for understanding the performance of such functions.

Referring to FIGURE 1, the data to be symbolically represented by printing on medium 10 is assumed to be received in serial form as electrical signals fed into serial to parallel converter 301, which receives a certain succession of electrical signals over a given interval of time, and then makes all signals of the succession available simultaneously to decoder 302, which identifies each significant combination of signals as representing a symbol to be printed, or as a control to effect a given operation, e.g., the movement of the paper or medium 10. There emerge from the decoder 302 as many separate channels, such as wires, as there are differently identifiable signal combinations; thus the signal combination representative of the letter "A" when fed into the decoder 302 will cause the appearance of a signal in that channel from the encoder 306 which corresponds to the letter "A." The path from the decoder 302 to the encoder 306 marked "50 wires" corresponds to the possibility of printing any one of fifty different symbols. The encoder 306, upon receipt of a signal over a given channel, applies a signal to those of the channels (marked "35 wires") between it and the initiating voltage pulse drivers 307 which correspond to those pins 20 of printing head 18 which should be energized in order to print a charge pattern delineating the letter "A."

There is one initiating voltage pulse driver for every pin electrode in the head 18 represented in FIGURE 15. However, since there are a number of such heads arranged in a row, there is not a separate initiating voltage pulse driver for every pin electrode in each such head. In the example represented here, and described in much more detail in the copending application for United States Patent, Serial No. 734,253, filed May 9, 1958, "Electrographic Recording Apparatus," by Benn, Howell and Sakurai, now U.S. Patent No. 3,068,479, which application is assigned to the same assignee as this application, all the homologous pins in the row of heads are connected to each other and to a single initiating voltage pulse driver. In other words, all the pin electrodes in the first row and first column of each head are connected to each other and to one initiating voltage pulse driver; similarly for all the pin electrodes in the first row and second column, and so on. Thus every pin electrode in every head is connected to one initiating voltage pulse driver. The initiating voltage produced by such a driver is insufficient by itself to produce any appreciable charge deposition upon the medium 10; but if an additional voltage of opposite sign is applied to the auxiliary electrode adjacent to a pin electrode to which initiating voltage has been applied, a discharge between the two named electrodes will occur which discharge will provide a source of free charged particles which will be available to be driven over against the medium 10 as previously described, forming an electrostatic charge pattern. In the particular embodiment here represented, all the auxiliary electrodes of each head are connected to each other and to a terminal of stepping switch 303. Stepping switch 303 has as many such terminals as there are heads. The actual operation of printing the character "A" in the first position comprises, then, the application of initiating voltage to those pin electrodes corresponding to the character "A" in all the heads; the setting of the stepping switch 303 in compliance with a signal received over the line marked "Advance" from decoder 302, to connect the output of the print voltage pulse driver 305 to the auxiliary electrodes of the first head; the same signal which set the stepping switch 303 is applied to delay 304 and, after a delay sufficient to assure that stepping switch has functioned, is applied to print voltage pulse driver 305, which then applies print voltage through stepping switch 303 to the auxiliary electrodes 22 of the first head. This causes discharges to occur between the auxiliary electrodes of the first print head and those selected pin electrodes of the first print head which have been fed initiating voltages. The unexcited pin electrodes of the first print head, and the excited pin electrodes of the other heads which do not have print voltages applied to their auxiliary electrodes, do not suffer discharges and therefore do not print. A charge pattern delineating the character "A" is formed under the first head only. The general operation here described is performed in turn at each head, with resultant printing of a line of charge patterns, or latent charge images. Control signals are fed from the decoder 302 to cause the paper transport mechanism 308 to cause the driving mechanism to feed the paper or medium 10 synchronously with the requirements of the printing operation.

After passing through the printing station 14, the charged line of characters on the recording medium 10 passes through the inking station 24 where at least the charge retentive layer of medium 10 is brought into contact with the new non-crushable electrically conductive powdered ink subsequently described and claimed herein, which ink adheres to and develops or renders visible the charged areas or electrostatic latent images on the recording medium.

The attractive forces between the ink particles and the electrically charged areas established on the recording medium are high and are tens of thousands of times greater than the weights of the particles, so that large numbers of the particles of the ink are strongly attracted to each charged area. A small number of ink particles may also adhere to the uncharged areas of the medium, but these particles are relatively easily removed by slight agitation of the recording medium or by subjecting the medium to suction as by a vacuum cleaner unit illustrated schematically at 26. At a fixing station generally indicated at 28, the developed charged areas are rendered relatively permanent by subjecting the developed image formed by the inked particles to pressure. This may be accomplished as shown by passing the recording medium 10 between rolls 30 and 32 so that the ink particles adhering to the charged areas are forced into the dielectric layer of medium 10 to a sufficient depth so that they are firmly secured to the medium. The developed medium may then be wound upon a take-up roll 34.

FIG. 3 is an example of the type of printing that may be produced by a page printer such as illustrated schematically in FIG. 1.

The means for converting teletype input signals, for example, into electrostatic latent images of alpha-numeric symbols represented by the coded input signals are indicated by the block diagrams of FIG. 1. The functions of the block method of operation of the printer are set forth in detail in the patent application, Serial No. 734,253, now U.S. Patent No. 3,068,479, referred to hereinabove.

FIG. 2 is a schematic diagram of a strip printer similar, except at the fixing station, to a printer described and claimed in copending application for United States Patent, Serial No. 714,767, filed February 12, 1958, by Herman Epstein and Robert E. Benn, entitled "Electrographic Recording Process," and assigned to the assignee of this invention. In the printer of FIG. 2, the recording medium 40 is in the form of an electrically conductive backing layer made of carbon loaded paper, for example, to which is affixed a thin dielectric layer made from material such as polyethylene, for example. The recording medium 40 may be initially wound on a storage reel 42. As the medium 40 is unrolled, it passes betweeen a back electrode 44 and a printing head 46 at the printing station generally indicated at 48 where electrically charged areas are established on selected portions of the recording medium 40. Input electric signals, which may be in the form of standard teletype code, are applied to the docoder 50. In the decoder 50, the coded input signals cause one conductor, which corresponds to the symbol, letter, or numeral represented by the code group, to be energized. In the encoder 52, the information represented by an energized line from decoder 50 is translated by means which determine which of the electrodes of the printing head 46 are to be energized and in what order they are to be energized to form or print the given information. The encoder 52 controls the energization of a plurality of pulse drivers 54, one of which is associated with each pin electrode of the printing head 46. All of this is described in greater detail in the last mentioned patent application and also in the copending application for United States Patent, Serial No. 443,646, filed July 15, 1958, by Herman Epstein and Frank T. Innes, entitled "Electrographic Printer," now U.S. Patent No. 3,012,839, which application is assigned to the same assignee as this application.

After the latent electrostatic images have been established on the charge retentive surface of the recording medium 40, the medium 40 is caused to pass through the inking station generally indicated at 60. Inking station 60 is illustrated as comprising a hollow body or housing 62 through which the medium 40 passes substantially vertically. Into the lower portion of housing 62 there is placed electrically conductive powdered ink 64, such as is described more particularly hereinafter. The recording medium 40 enters the bottom of the housing 62 through a narrow opening. Particles of the conductive ink 64 may be prevented from falling out of the opening by felt seals or the like, which are not illustrated. After the medium has passed through the load of ink particles 64, a portion of these particles will be attracted to and adhere to the charged areas of the dielectric layer of the recording medium 40 and some of the particles may be carried along on the uncharged areas of the dielectric layer. However, most of these which are not attracted by electrostatic forces to the electrically charged areas of the medium are removed by means such as vibrator 66, baffles 68, and vacuum cleaner 70.

After the recording medium emerges from the inking station 60, substantially all the adherent particles of ink will be found to be attached only to the electrically charged areas forming the desired images on the recording medium 40. The developed visible images on the recording medium 40 are then fixed thereto by being passed between pressure rollers 80 and 82, which rotate on axes mounted a fixed distance apart, the space between the adjacent peripheral surfaces of the rollers preferably being approximately equal to the thickness of the recording medium. Power to move the recording medium past the inking station and to drive the fixing rolls may be applied by a suitable motor which is not illustrated. The printed, developed, and fixed copy may then pass between guide rolls 84 and 86 and be wound upon a take-up roll 88. FIG. 4 is an example of a type of printing produced by the strip printer illustrated schematically in FIG. 2.

As indicated above, the electrically conductive ink of this invention has made it feasible to pressure fix a developed electrostatic image and, as will be more fully pointed out hereinafter, this has also lead to very economical means for making copies of electrostatically recorded messages.

In one embodiment of the invention, the crush-resistant conductive ink is made by silver coating small, generally spherically shaped, glass beads. A layer or coating of silver which is very thin, having a thickness of the order of one millionth of an inch, is applied to each bead. Glass beads formed of soda, lime and silica are commercially available, having a range of diameters of from 24 to 52 microns. Such commercially available glass beads are found to have approximately 100% by weight of the beads within the desired range. The density of such beads is approximately 2.5 grams per cubic centimeter; and the weight of the metal coating added to such beads, as hereinabove described, is so small that such addition has no appreciable effect on the density of the coated beads. Glass beads having these sizes and specific gravities are manufactured and sold by the Minnesota Mining and Manufacturing Company, St. Paul, Minnesota, under the trade name "Superbrite" glass beads. The particular beads described above are identified as type #500, in a brochure dated October 23, 1957, issued by Minnesota Mining and Manufacturing Company.

A metallic silver coating may be placed on such beads by the following process: 6.7 kilograms of the glass beads are placed in a polyethylene container or vessel having a 20 gallon capacity. The beads are sensitized for chemical deposition by initially preparing a sensitizing solution composed of 50 grams crystalline stannous chloride, $SnCl_2$, and a half a liter of concentrated hydrochloric acid, to which is added sufficient distilled water to form three liters of the solution. The sensitizing solution is poured on the glass beads in the container, and the beads are stirred in order that the entire mass of beads will be wetted by the sensitizing solution. After a period of time, from one to two minutes, the sensitizing solution is decanted from the vessel. The beads are then rinsed with tap water approximately five times; and then rinsed with distilled water until the silver nitrate test for chlorides indicates that chlorides are not present in the supernatant liquid. The excess water is then decanted from the vessel. A previously prepared "Brashear" silvering solution and a reducing solution are then poured into the cylinder containing the beads. The reducing solution is made of 225 grams of ordinary sugar (sucrose), 10 milliliters of concentrated nitric acid, $HNO_3$, and sufficient distilled water to form 2½ liters. The reducing solution is then brought to a slow boil for 5 minutes and then cooled to room temperature.

The silvering solution may be formed by dissolving 400 grams of crystalline silver nitrate, $AgNO_3$, in 6 liters of distilled water. Concentrated ammonium hydroxide solution, $NH_4OH$, is added until the solution turns dark brown. Additional concentrated $NH_4OH$ is then added until the solution cleared. A solution made of 200 grams of potassium hydroxide KOH pellets dissolved in 3 liters of distilled water is added which turns the $AgNO_3$ solution a brown color. Then concentrated $NH_4OH$ is added slowly with constant stirring until the solution just clears. A solution of silver nitrate made with 80 grams of $AgNO_3$ crystals per liter of distilled water is then added until the silvering solution becomes a light straw color.

After the silvering and reducing solutions are mixed with the glass beads, the mixture is stirred occasionally for approximately fifteen minutes. The spent silvering solutions are then decanted from the vessel and the silver coated beads are washed with distilled water one or two times, and then washed from three to five times with tap water until the test for silver, by a chloride solution, shows that $AgNO_3$ is no longer present. The beads are then dried by conventional means and are now ready to use.

This process produces a uniform thin metallic coating on each of the beads of approximately one millionth of an inch of silver. The bulk electrical resistance of the beads measured in the manner described above has been found to be 0.1 ohm. The beads have a silvery color which contrasts well with either black or white paper. The above process for silvering the beads is that known as "Brashear's" or the sugar reduction process. Numerous other silvering processes are described in the literature, such as "Procedures in Experimental Physics," Strong et al., Prentice-Hall, Inc., New York City, N.Y. (1938), Chapter IV.

Figure 5:
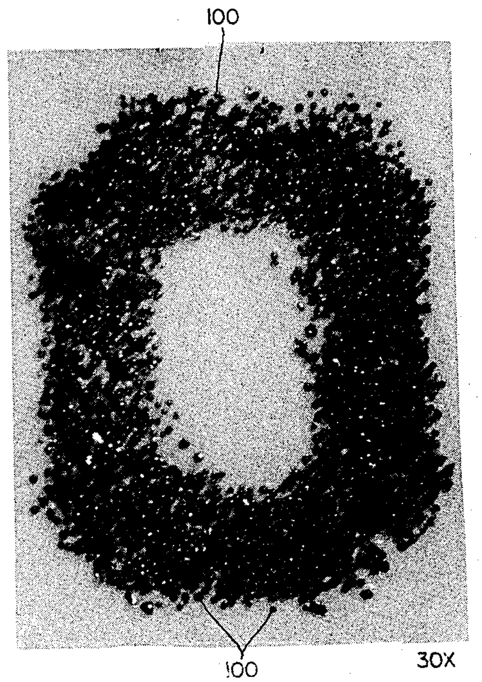
FIG. 5 is a magnified reproduction of the letter "O" of an electrostatic recorded message developed with the use of a non-crushable conductive ink and pressure fixed, the magnification being approximately 30 diameters.
Figure 6:
FIG. 6 is a reproduction of a photomicrograph of a portion of the letter of FIG. 5 having a magnification of approximately 100 diameters.

FIG. 5 is a magnified reproduction of a photomicrograph of the letter "O" formed of the silver coated glass beads previously described and applied to a recording medium by an electrostatic recording apparatus of the type illustrated schematically in FIG. 2 and employing a printing head composed of a rectangular matrix of printing electrodes. The letter "O" of FIG. 5 gives the impression that it is not made up of a series of dots which may be expected of a matrix type printing head for the reason that the diameters of the electrostatically charged areas established by each energized print electrode are substantially greater than the spacing between adjacent electrodes. It is thus apparent that solid type characters can be printed by such printing heads. With further reference to FIG. 5, individual silver coated glass beads 100, made as described above, can be seen. The discrimination between the ink and un-inked areas is obvious. Also, it should be noted that there is some variation in the size of the ink particles and that while a large majority of the particles appear to be substantially spherical, it is evident that some are not. FIG. 6 is an enlarged photographic reproduction of a portion of FIG. 5, and it shows the silver coated beads 100 more clearly. The disturbance of the dielectric layer visible in FIG. 6 is indicative of the forced impression of the beads 100 into the dielectric layer of the recording medium.

Figure 7:
FIG. 7 is a cross sectional photomicrograph through a portion of a pressure fixed printed character such as shown in FIGS. 5 and 6, the magnification being approximately 75 diameters.

FIG. 7 is a magnified photograph of a cross section through a part of a recording medium 40 on which a developed electrostatic latent image has been formed by the pressure fixing of the silver coated glass beads 100 previously described onto the dielectric layer 106 of the recording member. In addition to showing the pressure fixed beads, FIG. 7 also shows the laminated character of the recording member 40. It is composed of an electrical conductive backing layer 104 and a thin dielectric layer 106 to which the glass beads adhere. The thickness of the dielectric layer 106, as initially placed on recording medium 40, is best noted at the right side of FIG. 7. Where a latent electrostatic image has been formed, developed, and fixed, as seen in the left portion of FIG. 7, it is observed that the conductively coated beads 100 are pushed well into the dielectric layer 106 to the point where many of them appear to contact the backing layer 104 and that the material of the dielectric layer has flowed around the individual beads.

Another very satisfactory ink is made in accordance with this invention by coating glass beads with metallic copper. In this process, one kilogram of glass beads identified as type #500 by the Minnesota Mining and Manufacturing Company, as indicated hereinabove, are placed in a suitably sized polyethylene container or vessel. The beads are sensitized by a solution which may comprise 0.1 liter of concentrated hydrochoric acid and 10 grams of crystalline stannous chloride, $SnCl_2$, to which is added distilled water to bring the volume up to 1.5 liters. The sensitizing solution is poured onto the glass beads and the beads are stirred so that they are well wetted by the sensitizing solution. After one or two minutes, the sensitizing fluid is decanted. The beads are then rinsed with tap water, preferably five times, to remove the sensitizing fluid. The excess water is then decanted. A second sensitizing fluid is then poured into the container with the beads, which solution is formed from ½ gram of palladium chloride $PdCl_2$ crystals and 10 milliliters of concentrated HCl solution to which is added sufficient distilled water to form one liter. The beads are stirred so that all the beads are wetted by the second sensitizing solution. After about one minute, the second sensitizing fluid is decanted, and the beads are washed five times with tap water, and then all excess water is decanted. To the sensitized beads there are then added two solutions. Solution "A" is formed from 85 grams of crystalline cupric sulphate $CuSO_4 \cdot 5H_2O$, 25 grams of crystalline nickel chloride $NiCl_2 \cdot 6H_2O$, one liter of Formalin (30% solution) which solution is then diluted to 1.5 liters by the addition of distilled water. Solution "B" is formed from 62 grams of sodium hydroxide NaOH pellets, 275 grams of Rochelle salt (sodium-potassium tartrate) crystals; 25 grams of sodium carbonate $$Na_2CO_3 \cdot H_2O$$

crystals to which is added distilled water to make 1.5 liters. Solutions "A" and "B" together with the beads are stirred occasionally, rather vigorously, for about thirty minutes. The spent coppering solutions are then decanted and the copper coated beads are washed with tap water five times. The copper coated beads are then dried by conventional drying apparatus. The resulting beads have a copper color and a bulk electrical resistance as measured, as described supra, of approximately 100 ohms. The thickness of the metallic copper coating of the beads is in the order of one millionth of an inch.

Such silver and/or copper coated glass beads may be darkened by treating them with a solution formed of 25 milliliters of ammonium polysulfide, $(NH_4)_2S_x$, to which is added sufficient distilled water to form one liter. This amount is added for each kilogram of beads to be darkened. The beads are stirred in the darkening solution for about one minute after which the darkening solution is decanted. The beads are then washed five times with tap water and dried.

Glass beads which are commercially available have a significant advantage over many other particles available in the desired range of sizes in that they have a closely limited distribution of particle sizes. This substantially eliminates problems resulting from too small and too large particles of ink. Glass beads are also very strong, tough or crush resistant, and under pressure test, a single one of such beads has been found able to support a weight of from 10 to 15 pounds when tested between two hardened steel plates. Thus they are very suitable for pressure fixing of the ink to the recording medium. The silver coating on the beads produces a developer or inking pigment having a minimum bulk electrical resistance and its bulk resistance does not change substantially with time, both characteristics being very desirable properties for a conductive developer. Satisfactory powder developers for electrostatic printing have also been formed of glass beads of the character described herein coated with metallic gold, platinum, palladium, and rhodium. Well known techniques may be used for coating glass pellets within the desired range. See Strong et al., loc. cit. The term "micron" is a metric system unit of measure meaning one millionth of a meter. It is readily calculable that a micron is equal to about 40 millionths of an inch.

Another embodiment of the invention employs crush resistant conductive powdered ink made by coating substantially non-vitreous clay particles, such as are known as cracking catalysts, with a substantially uniform layer of conductive carbon. Clay fluid catalysts are commercially available in large quantities. (The terms "fluid catalysts" and "cracking catalysts" derive from their use in a process known as the fluid catalytic cracking process.) Their specific gravity ranges from about 2.5 to about 3.5. The carbon coating for the particles of the catalysts may be achieved by pyrolysis, or the thermal cracking of a hydrocarbon gas, such as methane.

Samples of a non-friable electrostatic developer comprising carbon coated fluid cracking catalyst may be made by the apparatus illustrated schematically in FIG.

8. One hundred cubic centimeters of fluid clay cracking catalyst is placed in a retort, or reactor 110. A suitable clay pellet of this type is made by the Davison Chemical Company, Baltimore 3, Maryland, and identified as type F2. The retort 110 is made of a high temperature glass, a suitable glass for this purpose being known as "Vycor." The F2 cracking catalyst produced by Davison Chemical Company includes approximately 4% by weight of particles less than 20 microns in average diameter, and approximately 8% by weight of the particles are of greater size than 74 microns. Those particles of 80 microns or greater size may be removed by suitable screening techniques, and the particles of less than 20 micron size may be substantially all removed by gaseous elutriation during the pyrolytic process to be described.

The reactor or retort 110 is placed in an electrical heating oven 112, the heating coil of which is shown in FIG. 8. In a preferred form, methane gas, obtained from a high pressure storage tank 114 is led through a pressure reducing valve 116 and a flow regulating valve 118 into the lower region of retort 110, where the non-vitreous clay catalyst particles 120 are located. When methane gas is used, the temperature of the retort is maintained substantially at a temperature of 950 degrees centigrade, and the valve 118 regulated so that one and one-half cubic feet per hour of methane gas is caused to flow into and upwardly through the catalyst particles 120. After the pyrolytic process has continued for approximately three hours, substantially from 95 to 100 percent of the particles of the cracking catalysts receive a substantially uniform carbon coating deposit, the carbon coating produced by this process and exposure being of the order of .1 to 1 micron thick, as a result of the pyrolysis of methane within the reactor 110. A thickness of about .1 to 1 micron thick corresponds in the English system of units to about 4 to 40 millionths of an inch thick.

The bulk electrical resistance of the now carbon coated clay particles is of the order of 100 ohms as measured in the manner described earlier. The bulk resistance of a mass of carbon coated particles is primarily a function of the percentage of particles that have obtained a uniform carbon coating over their entire surface, which, it may be added, adheres tenaciously to each such particle of the fluid catalysts. If the percentage of coated particles drops substantially below 95%, the bulk resistance of the mass of such particles rapidly rises and will exceed the upper limit desired for conductive inks, which is of the order of 10,000 ohms, by the above referred to measurements. While the pyrolysis of methane is a preferred method of coating the fluid catalyst particles, other hydrocarbon gases such as ethane, propane, acetylene, etc., may also be used for coating such non-vitreous clay particles. If gases such as acetylene, whose pyrolysis is strongly exothermic are employed, suitable precautions to control the temperature rise resulting therefrom should be employed.

The flow of the gas through the retort 110 is made sufficiently vigorous so that there is slugging, or violent or geyser-like eruptions, of the particles within the retort. As a result, a great majority of the particles having a size less than 20 microns are removed from the top of the retort by the gases flowing upwardly therethrough. Thus the particles of less than the desired minimum size may be substantially removed.

Figure 9:
FIG. 9 is a magnified reproduction of the letter "H" of an electrostatic recorded message developed with the use of a non-crushable conductive ink formed from carbon coated substantially non-vitreous ceramic particles pressure fixed to the recording medium, the magnification being approximately 30 diameters.
Figure 10:
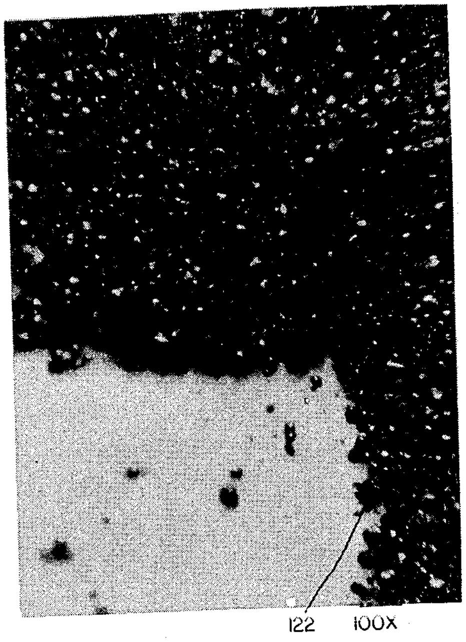
FIG. 10 is a reproduction of a photomicrograph of a portion of the letter of FIG. 9 having the magnification of approximately 100 diameters.

FIG. 9 is a photographic reproduction of a photomicrograph of the letter "H" formed of the carbon coated clay particles previously described and applied to a recording medium by the electrostatic recording apparatus schematically illustrated in FIG. 2. The electrostatic printing head is a matrix type head, but because the diameters of the electrically charged areas established on the recording medium are greater than the distance between adjacent electrodes, FIG. 9 exhibits a solid rather than dot-formed character. The close packing of the carbon coated clay catalyst made and printed as described above, is readily evident. Discrimination between inked and un-inked areas is very obvious. FIG. 10 is an enlarged photographic reproduction of a portion of FIG. 9 and shows the carbon coated catalyst particles 122 in greater detail.

Figure 11:
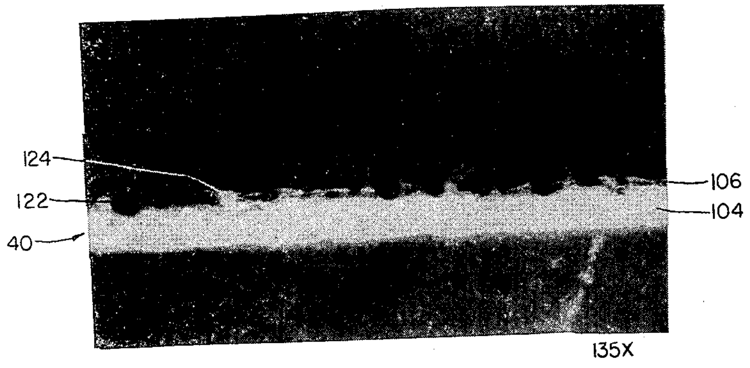
FIG. 11 is a cross sectional photomicrograph through a portion of a pressure fixed printed character such as shown in FIG. 9 and 10, the magnification being approximately 135 diameters.

FIG. 11 is an enlarged photographic reproduction of a cross-section of a portion of a recording medium 40 in which an electrostatic latent image has been established and developed by the carbon coated fluid catalyst beads 122 and which have been pressure fixed to the dielectric layer 106 of medium 40. It is also clear that the carbon coated fluid catalyst particles 122 are pushed well into the dielectric 106 to the point where most of them appear to contact the conductive backing layer 104; and that the material of the dielectric layer 106 has flowed around the individual particles 122. In FIG. 11 the conductive layer 104 is made with an electrically conductive white resin in lieu of the carbon loaded paper previously described herein. The white area 124 in the photomicrograph of FIG. 11 is believed to have been caused by the accidental removal of one of the particles while the specimen was being ground for the purpose of making the photograph. The cavity left by removal of the particles was apparently filled by the white colored compound used for grinding the specimen.

It is evident from FIGS. 7 and 11 that the particles of the developer are pushed partly into the dielectric layers of recording mediums by the pressure fixing operation yet protrude above the normal undeveloped surface of the dielectric. It is also apparent that the dielectric flows up around and firmly holds the particles of the ink in the dielectric layer. The diameters of the ink particles range from 1 to 2 mils so that the layer formed thereby is from ⅓ to ½ as thick as the backing layer of the recording member which is approximately 3 mils thick in the specimens illustrated. Those portions of the recording medium upon which an electrostatic latent image has been established, developed and pressure fixed are thus thicker than undeveloped areas. This difference in thickness is sufficient so that the electrostatically recorded document will serve, as described hereinafter, as a relief master from which copies of the message so electrostatically recorded can be made.

FIG. 12 illustrates one arrangement for making a duplicate copy from an electrostatically printed master having the characters thereof formed by hard, crush resistant, electrically conductive pigment particles previously described. In this arrangement an electrostatically recorded relief master 130, formed as shown in FIGS. 7 or 11, a sheet of copy paper 132, and a sheet of carbon paper 134 are superposed on one another in the order mentioned in order to form a positive copy on copy paper 132 of the electrostatically recorded information on master 130. Carbon paper 134 is placed so that the carbon side, or color layer, is in contact with the upper surface of copy paper 132. This order of superposition is different from that ordinarily employed in making of carbon copies on a typewriter, where a type face is forced against carbon paper which is in turn pressed against copy paper, which is supported by the platen or roller of the typewriter carriage. The conventional procedure produces a carbon mark which is the mirror image of the type face viewed directly. Here, however, it is desired to produce an unreversed, or direct, image of the pattern of ink particles on master 130. It is therefore necessary to employ the order shown so that the ink particles will press the copy paper against the carbon paper 134, producing a direct image of the pattern of ink particles upon the upper side (in FIGURE 12) of the copy paper 132.

The manifold formed by carbon paper 134, copy paper 132 and relief master 130 is then passed between two cylindrical pressure rolls, such as shown at 140, 142, in FIG. 13. Rolls 140, 142 are preferably made of steel. The surfaces of the rolls are accurately ground, polished and hardened. Their diameters may be from 1 to 2 inches so that they will be rigid under pressures to which they are subjected. Upper roll 140 is mounted in any conventional manner so that the distance between rolls may be varied. The distance between the surfaces of the rolls is adjusted so that it approximates the combined thickness of the undeveloped portion of the master 130 and the two thicknesses of the carbon and copy papers being passed between the rolls at one time. Power for driving the rolls 140, 142, which are geared to rotate together, may be supplied by a motor which is not illustrated, or by hand. The rigid, hard surfaced rolls keep background discoloration of the copy sheet to a minimum. FIGURE 12 has been drawn to represent how the ink particles 100, having been firmly attached by being pressed through the dielectric medium 106 at least partially into the backing layer 104, still partly protrude above the surface of the medium 106.

FIG. 14 shows another arrangement for producing a positive copy from an electrostatically recorded master copy 130. In this figure, the developed side of master 130 forms an outer surface of the manifold to be fed through the rolls. The carbon paper 134 is between the relief master 130 and the copy sheet 132, with the color layer of carbon paper 134 in contact with the adjacent layer of the copy paper 132. When the manifold of the relief master 130, carbon paper 134, and copy paper 132 is passed between rolls 140, 142, of the apparatus illustrated in FIG. 13, a positive carbon copy of the developed and fixed electrostatic image on the relief master 130 will be produced on copy paper 132. Obviously, carbonless transfer papers can be used with a relief master 130 to form copies of the information recorded on the master in a similar manner. It is demonstrable that up to three to four legible copies may be made from the relief master at one time by suitably manifolding the additional copy papers and carbon papers and then passing the manifolded papers including the relief master between the rollers 140, 142. It is not necessary to pressure fix the ink particles prior to making copies. The pressure rolls 140, 142 may be used to perform both operations at the same time, the pressure fixing and copy duplication occurring as the manifold of papers are passed between the rollers. FIGURE 14, similarly to FIGURE 12, has been drawn to show in detail ink particles 122 pressed through medium 106 into backing 104, but protruding somewhat above the surface of medium 106. If pressure fixing is combined with the making of copies, the master 130 will not assume the appearance represented in FIGURE 14 until after the combined pressure fixing and copying operation.

Since the dielectric layer 106 of FIG. 7 is hydrophobic and the metal coated glass beads 100 are hydrophilic, electrostatically recorded information using metallic coated particles also readily lends itself to be duplicated by either the gelatin or offset duplicating process. For this purpose, the dielectric layer and the embedded ink particles constitute a master whose different parts are differentially wettable by the printing or reproducing inks used in the named process.

Fluid ink printing utilizing the relief masters previously described has been found to give satisfactory black reproductions from a master of silver-coated glass beads on polyethylene base in an aqueous suspension of carbon thickened slightly by the addition of glycerin. A particular ink material which has been used satisfactorily is that known commercially as Columbia Carbon Aquablak Number 15, sold by the Columbia Carbon Company of 380 Madison Avenue, New York City 17, New York. About twenty-five percent by volume of U.S.P. glycerine is added to the Aquablak and suitably stirred or mixed until a substantially homogeneous mixture results. The master of silver-coated glass beads on polyethylene base should preferably be cleansed with toluol to insure the removal of any casually adhering hydrophilic, or water-wettable, impurities on the polyethylene. The Aquablak-glycerine mixture is then applied with a brush to the master; the mixture adheres to the silver-coated particles only; when a sheet of ordinary paper is brought into contact with the master, the carbon-containing Aquablak-glycerine mixture is transferred from the silver surface to the paper, thus forming a black reproduction on the paper of the matter delineated by the silvered electrostatic printing ink. Such a copy will, of course, be a mirror image of the master.

In electrostatic printing it is possible so to alter the connections to the head electrodes as to produce mirror images of the desired symbols so that a master produced by use of a printing head so connected is capable of producing correctly oriented copies. Such alteration of printing head connections, while not lightly to be undertaken, is an undertaking of less magnitude than that of providing a typewriter with a complete reversed font. It is, of course, also possible to employ an intermediate transfer medium so that the final copy will be a mirror image of a mirror image and thus a true or unreversed copy of the master. The gelatin process is an example of such a transfer process. If a master of silver-coated beads or spheres on a polyethylene backing is cleaned with toluol and then painted with hectograph or gelatin-duplicator ink, commercially available from many sources (see "Tools of the Office—Duplicating Equipment" by Robert Beeman, in the March 1956 issue of the magazine "Office Management"), the ink will adhere to the silver surface but not to the polyethylene. The master is then brought into contact with the surface of a gelatin reproducing sheet. The duplicator ink adhering to the silver surface of the electrographic printing ink is then transferred to the gelatin (as a mirror image of the original master). The master is removed from the gelatin sheet, and a sheet of copy paper is pressed against the gelatin sheet. Some of the duplicator ink will then be transferred from the gelatin sheet to the copy paper, producing on the copy paper a mirror image of the duplicator ink pattern on the gelatin sheet, which mirror image will be a true image of the electrostatic ink pattern on the master. The gelatin reproducing process is often limited in its application by the fact that the quantity of duplicator ink stores in the gelatin sheet is limited, and permits the production of only a limited number of copies; but when a permanent master like that produced by the practice of this invention is available, the supply of ink in the gelatin sheet may be replenished with very little difficulty, permitting the production of an increased number of copies.

Perforate stencils of the type employed in the process known, inter alia, under the trade name "Mimeograph," may readily be prepared by the use of a master developed by ink particles as herein disclosed. Thus, in FIGURE 12, 132 may be considered to represent a perforatable stencil blank which conventionally by the present art would consist of fibrous material covered with a waxy coating readily displaced by pressure, producing an effective perforation for passage of duplicating ink. If, then, 134 is considered to represent a backing sheet, it is clear that passage of the manifold through the constriction presented by the rolls 140 and 142 of FIGURE 13 will cause the particles 100 of the electrostatic printing ink to press through the coating of the adjacent portions of stencil blank 132, rendering those portions perforate. Such an operation will produce perforations in stencil blank 132 corresponding to the distribution of the particles 100, and thus transform the stencil blank 132 into a perforate stencil reproducing the original pattern of the master 130.

From the foregoing, it is believed clear that the nonfriable conductive ink and pressure fixing techniques for electrostatically recording information, have many advantages over the previous types of conductive inks and fixing methods. As a consequence of these developments, electrostatically recorded information which has been developed with such non-crushable inks constitutes a relief master, so that any number of copies of the original messages may be reproduced by relief duplicating methods, at reasonable cost per copy. When a metal coated crush-resistant ink, such as silver coated glass beads, is used to develop electrostatically latent images, then the hydrophobic-hydrophilic characteristics of the dielectric and the ink make it possible to easily produce gelatin, offset, and stencil masters.

In broad summary, the various embodiments herein described partake of the following characteristics: A base material is provided which has the desirable characteristics of low density, good mechanical strength which results in resistance to crushing and non-friability, and which can be economically provided in particles of a relatively limited range of sizes, and sufficiently approximating spheres in shape so that large numbers of such particles will flow freely without interlocking with each other in such fashion as to produce caking, lumping, or bridging. Many materials having these desirable properties (including glass spheres and clay cracking catalyst particles) do not have the essential characteristic of good electrical conductivity between particles when in contact with one another in normal atmosphere. Therefore particles of such base materials are coated or covered with suitable electrically conductive materials. It does not then matter that these conductive materials do not themselves possess all the desirable properties described for the base materials; by the practice of this invention, the desirable properties of the base material supply the defects of the coating material, and the desirable properties of the coating material supply the defects of the base material, yielding a product having all the required properties. Furthermore, the comparative freedom of choice of materials made possible by this invention permits the selection of electrically conductive materials which have additional desirable properties of being wet or not wet by selected conventional printing or reproducing inks; and the possibility of using strong crush-resistant base materials permits the use of pressure-fixing of the particles at ordinary room temperature, and the ready making of carbon copies, or other forms of reproduction using pressure-sensitive media.

Obviously many modifications and variations of the present invention are possible in the light of the above teachings. It is, therefore, to be understood that within the scope of the appended claims the invention may be practiced other than as specifically described and illustrated.

What I claim is:

1. An electrically conductive ink for use in the development of electrostatic latent images; said ink comprising non-friable glass particles having substantially 100% of the particles within the range of from 10 to 80 microns in diameter and coated with an opaque electrically conductive metal material of the order of 1 millionth of an inch thick, the bulk electrical resistance of said ink being less than 10,000 ohms and the specific gravity of the particles being substantially not greater than four, said metal of said coating being chosen from the group consisting of silver, copper, gold, palladium and rhodium.

2. An electrically conductive powdered ink for developing electrostatic latent images comprising particles ranging in size substantially from 10 to 80 microns, a specific gravity not substantially exceeding four, each having a non-friable core selected from the groups consisting of (1) non-vitreous ceramic particles substantially each of which is coated with electrically conductive carbon, said carbon coating being approximately at least .1 to 1 micron thick and (2) glass beads substantially each of which is coated with a metal chosen from the group of metals consisting of silver, copper, gold, palladium and rhodium, said metal coatings being approximately at least one millionth of an inch thick, the bulk resistance of the ceramic coated particles and the bulk resistance of the glass bead coated particles being less than 10,000 ohms and the coated particles being opaque and visible.

3. An electrically conductive powdered ink for developing electrostatic latent images; the particles of said ink comprising non-friable glass beads, substantially all of the particles having diameters within the range of from 10 to 80 microns, having a specific gravity not substantially exceeding 4, and each of said glass beads being coated with a metal chosen from the group of noble metals consisting of gold, palladium and rhodium, said coating being opaque and approximately at least one millionth of an inch thick, the bulk electrical resistance of said ink being less than 10,000 ohms.

4. An electrically conductive powdered ink for developing latent electrostatic images, said ink comprising glass beads substantially all of which have diameters within the range of from 10 to 80 microns and a specific gravity not substantially exceeding 4 and substantially all of which are coated with a thin layer of electrically conductive visible metal material said material chosen from the group of metals consisting of silver and copper of characteristics to be visible, said layer being approximately at least one millionth of an inch thick, and said layer being of physical characteristics and dimensions such that the bulk electrical resistance of said ink is less than 10,000 ohms.

5. An electrically conductive ink for use in the development of electrostatic latent images, said ink comprising substantially non-vitreous ceramic particles a substantial portion of which have diameters within the range of from 10 to 80 microns and the specific gravity of the particles being substantially not greater than four and substantially all of which are coated with an electrically conductive carbon, said coating being at least approximately .1 to 1 micron thick, the bulk electrical resistance of said ink being less than 10,000 ohms, such that said ink is uncharged and sufficiently conductive for developing an electrographically recorded upon dielectric medium.

6. An electrically conductive ink for use in the development of electrostatic latent images, said ink comprising substantially non-vitreous ceramic particles a substantial portion of which have diameters within the range of from 10 to 80 microns and a specific gravity not greater than 4 and substantially all and at least 95% of which particles are uniformly coated with an electrically conductive carbon, the coating being substantially at least .1 micron to 1 micron thick, the bulk electrical resistance of said ink being less than 10,000 ohms, said ink being opaque and visible.

7. In the electrostatic recording process in which an electrostatic latent image is established on the deformable charge retentive surface of a recording medium: the improvement comprising developing said latent image by passing said recording medium through an electrically conductive uncharged ink, the particles of which ink are tough and nonfriable glass beads having diameters substantially within the range of 10 to 80 microns and a specific gravity not substantially exceeding 4 and being coated at least to a thickness of approximately one millionth of an inch with a metal chosen from the group consisting of silver, copper, gold, palladium and rhodium, said coated glass beads having a bulk electrical resistance of less than 10,000 ohms, and fixing said inked images solely by physically forcing the particles adhering to the latent image at least partially into the charge retentive surface of the recording medium for firm adherence thereto.

8. In the electrostatic recording process in which an electrostatic latent image is established on the deformable charge-retentive surface of a recording medium: the improvement comprising developing said latent image by passing said recording medium through electrically conductive uncharged ink, the particles of which ink are tough and non-friable, non-vitreous ceramic particles having diameters substantially within the range of 10 to 80 microns and a specific gravity not substantially exceeding 4 and substantially all of which are coated with an electrically conductive carbon to a thickness of at least approximately one-tenth to one micron, said coated ceramic particles having a bulk electrical resistance of less than 10,000 ohms, and fixing said ink images solely by physically forcing the particles adhering to the latent image at least partially into the charge-retentive surface of the recording medium for firm adherence thereto.

9. In the electrostatic recording process in which an electrostatic latent image is established on the charge retentive surface of a recording medium: the improvement comprising developing said latent images by passing said recording medium through an electrically conductive uncharged visible ink made from substantially non-vitreous ceramic particles coated with electrically conductive carbon to a thickness of at least one-tenth of a micron to one micron, the bulk electrical resistance of the ink being less than 10,000 ohms by the pyrolysis of a hydrocarbon compound until from 95 to 100% of the particles are substantially uniformly coated with carbon, a substantial portion of all the particles being within a distribution of sizes ranging from 10 to 80 microns and a specific gravity not greater than four.

10. The method of forming a relief printing master which comprises establishing electrostatic charged areas on selected portions of a charge retentive surface of a recording medium which has a surface coating which is plastic so as to be indentable under pressure, said charged areas being representative of information, inking said charged areas with a powdered conductive visible uncharged ink consisting of particles, substantially each particle of which is a non-friable glass bead inner body which has a metal coating of approximate thickness of at least one millionth of an inch, said metal coating being chosen from the group of metals consisting of silver, copper, gold, palladium and rhodium and has a high resistance to crushing and wherein said particles have a bulk resistance of less than 10,000 ohms, are of diameter size range of approximately 10 to 80 microns and a specific gravity of up to 4 approximately, securely attaching said particles to each electrically charged area of the recording medium in projecting relation thereto by partial embedment therein whereby a relief printing master is produced.

11. The method of forming a relief printing master which comprises establishing electrostatic charged areas on selected portions of a charge-retentive surface of a recording medium which has a surface coating which is plastic so as to be indentable under pressure, said charged areas being representative of information, inking said charged areas with a powdered conductive visible uncharged ink consisting of particles, substantially each particle of which is a non-friable, non-vitreous ceramic particle which has a carbon coating of approximate thickness of at least one-tenth of a micron and wherein said particles have a bulk resistance of less than 10,000 ohms, are of diameter size range of approximately 10 to 80 microns and of a specific gravity of up to 4 approximately, and securely attaching said particles to each electrically charged area of the recording medium in projecting relation thereto by partial imbedment therein whereby a relief printing master is produced.

12. The method of making copies of a message which comprises establishing electrostatic latent images of the message on the charge retentive surface of a recording medium, developing the said electrostatic latent images by subjecting the recording medium to a mass of normally non-crushable ink particles having an attraction for the electrostatically charged areas of the medium to thus cause such particles to form a lightly adhering coating thereover; and substantially simultaneously (1) permanently fixing the developed latent images to the said recording medium; and (2) making copies of the said developed and fixed images by bringing the said recording medium bearing said developed and fixed images in juxtaposition with copy paper associated with means for producing localized visible marks on said copy paper in areas coincident with the application to said mark producing means and said copy paper of localized pressure; and subjecting said juxtaposed combination of image-bearing recording medium and copy paper to mechanical constriction in a direction substantially normal to the plane of said juxtaposed combination at the point of said constriction, said constriction being of such opening size as to produce in the areas of attachment of said ink particles localized pressure sufficient to cause said mark producing means to produce visible marks on said copy paper in said area, but to permit the presence in said constriction of said juxtaposed combination without the production of mark-producing pressure in areas where no said ink particles are present.

13. The method of making copies of a message which comprises establishing electrostatic latent images of the message on the charge retentive surface of a deformable recording medium, developing the said electrostatic latent images by bringing the said charge retentive surface of the medium on which the latent images have been established into contact with ink made of non-friable particles which particles then adheringly protrude above said surface; making copies of the developed said images by bringing the said recording medium bearing said protruding developed images in juxtaposition with copy paper provided with means for producing localized visible marks on said copy paper in areas coincident with the application to said mark producing means and said copy paper of localized pressure; and subjecting said juxtaposed combination of image-bearing recording medium, mark producing means, and copy paper to mechanical constriction in a direction substantially normal to the plane of said juxtaposed combination at the point of said constriction, said constriction being of such opening size as to produce, in first areas where said ink particles are present, localized pressure sufficient to cause said mark producing means to produce visible marks on said copy paper in said first area, but to permit the presence in said constriction of said juxtaposed combination without the production of mark-producing pressure in second areas where no said ink particles are present and sufficient to cause simultaneous partial imbedment of said particles into said medium.

14. The method of making copies of a message which comprises establishing electrostatic latent images of the message on the charge retentive surface of a recording medium, developing the said electrostatic latent images by subjecting the recording medium to a mass of normally non-crushable ink particles having an attraction for the electrostatically charged areas of the medium to thus cause such particles to form a lightly adhering coating thereover; simultaneously fixing and making copies of the developed said images by bringing the said recording medium bearing said developed images in juxtaposition with copy paper associated with means for producing localized visible marks on said copy paper in areas coincident with the application to said mark producing means and said copy paper of localized pressure; and subjecting said juxtaposed combination of image-bearing recording medium and copy paper to mechanical constriction in a direction substantially normal to the plane of said juxtaposed combination at the point of said constriction, said constriction being of such opening size as to produce, in first areas where said ink particles are present, localized pressure sufficient to fix said ink particles in said charge retentive surface and to cause said mark producing means to produce visible marks on said copy paper in said first area, but to permit the presence in said constriction of said juxtaposed combination without the production of mark-producing pressure in second areas where no said ink particles are present.

15. The method of forming a differentially wettable printing master which comprises establishing electrostatically charged areas on selected portions of the polyethylene charge retentive surface of a recording medium, said charged areas being representative of information, inking said charged areas with a powdered ink consisting of conductively coated, uncharged particles having a high resistance to crushing, said particle coating being of material sufficiently conductive in bulk for electrographically developing said electrostatically charged areas, said coating material being silver, the bulk electrical resistance of said powdered ink being less than 10,000 ohms, said ink particles being in the range substantially from 10 microns to 80 microns and of a specific gravity of substantially up to 4, the surfaces of said particles having an affinity for being wet by a suspension of carbon in water thickened slightly by glycerin ink substantially different from the affinity for being thus wet possessed by said charge retentive surface; and securely attaching said particles adhering to each electrically charged area to said charge retentive surface by causing said particles to substantially permanently adhere to said surface whereby a differentially wettable printing master is produced.

16. The method of forming a differentially wettable printing master which comprises establishing electrostatically charged areas on selected portions of the charge retentive surface of a recording medium, said charged areas being representative of information, inking said charged areas with a powdered electrically conductive ink consisting of particles formed of a non-friable glass bead core and a coating of silver of a thickness of at least 1 millionth of an inch approximately, said ink comprising particles substantially all of which are within the range of ten to eighty microns diameter and a specific gravity of up to four, said ink having a bulk electrical resistance of less than 10,000 ohms, the coated surface of said particles having an affinity for being wet by hectrograph duplicator ink substantially different from the affinity for being thus wet possessed by said charge retentive surface when cleaning of the recording medium having silver coated particles thereon to remove impurities is effected; and securely attaching said particles adhering to each said electrically charged area to said charge retentive surface by causing said particles to substantially permanently adhere to said surface in partially protruding relationship whereby a differentially wettable printing master is produced.

17. As a new product, a relief reproducing master comprising: a base sheet having a dielectric layer on one surface thereof having a moderate plasticity so as to be indentable under pressure, an ink disposed to delineate a message on said dielectric surface layer and composed of substantially non-crushable particles electrically conductive in bulk of an upper limit of 10,000 ohms resistance and of diameter sizes in the range from 10 to 80 microns and of specific gravity substantially not exceeding four, and which particles consist of glass beads coated with a metal chosen from the group consisting of silver, copper, gold, palladium and rhodium, said coating being substantially at least one millionth of an inch thick and which particles are secured to the base sheet by partial embedment in the dielectric surface thereof, the particles projecting above the surface of the dielectric layer to form a relief reproducing master.

18. As a new product, a relief reproducing master comprising: a base sheet having a dielectric layer on one surface thereof having a moderate plasticity so as to be indentable under pressure, an ink disposed to delineate a message on said dielectric surface layer and composed of substantially non-crushable particles, electrically condutive in bulk of an upper limit of 10,000 ohms resistance and of diameter sizes in the range from 10 to 80 microns and of specific gravity substantially not exceeding four, and which particles consist of non-vitreous ceramic cores wherein over 95% of said cores are coated with a conductive carbon of a thickness of at least .1 to 1 micron, and which particles are secured to the base sheet by partial imbedment in the dielectric surface thereof, the particles projecting above the surface of the dielectric layer to form a relief reproducing master.

References Cited by the Examiner

UNITED STATES PATENTS

| | | | |
|---|---|---|---|
| 1,146,852 | 7/1915 | Dick | 101—128.4 |
| 1,795,480 | 3/1931 | Dugdale | 101—274 |
| 2,297,691 | 10/1942 | Carlson. | |
| 2,357,809 | 9/1944 | Carlson. | |
| 2,647,464 | 8/1953 | Ebert. | |
| 2,681,473 | 6/1954 | Carlson. | |
| 2,758,939 | 8/1956 | Sugarman. | |
| 2,807,233 | 9/1957 | Fitch. | |
| 2,839,400 | 6/1958 | Moncrieff-Yeates. | |
| 2,891,011 | 6/1959 | Insalaca | 252—62 |
| 2,891,911 | 6/1959 | Mayer et al. | 252—62 |
| 2,919,171 | 12/1959 | Epstein et al. | |
| 2,932,690 | 4/1960 | Adams et al. | |
| 2,939,804 | 6/1960 | Schossberger. | |
| 2,940,847 | 6/1960 | Kaprelian. | |
| 2,955,052 | 10/1960 | Carlson. | |
| 2,993,787 | 7/1961 | Sugarman. | |
| 3,012,839 | 12/1961 | Epstein et al. | |
| 3,166,510 | 1/1965 | West et al. | 252—62 |

FOREIGN PATENTS

| | | |
|---|---|---|
| 157,135 | 6/1954 | Australia. |
| 562,909 | 12/1957 | Belgium. |

DAVID KLEIN, *Primary Examiner.*

R. A. LEIGHEY, *Examiner.*